United States Patent Office 3,166,505
Patented Jan. 19, 1965

3,166,505
COPOLYMERS OF DIALKENYL PHOSPHORUS ESTERS AS LUBRICATING OIL ADDITIVES
Peter Kirby, Kelsall, England, assignor to Shell Oil Company, a corporation of Delaware
No Drawing. Filed Oct. 4, 1960, Ser. No. 60,303
Claims priority, application Great Britain, Jan. 29, 1960, 3,281/60
6 Claims. (Cl. 252—49.8)

This invention relates to lubricating compositions containing ashless polymeric additives and to the additives themselves, particularly additives that improve the load carrying capacity of lubricating oils, and more particularly poly-functional additives that improve not only the load carrying capacity, but also one or more other properties, e.g. the viscosity/temperature characteristics and the detergency of lubricating oils.

According to the present invention, lubricating compositions are provided which comprise a major proportion of a lubricating oil and a minor proportion of a copolymer of a dialkenyl substituted phosphorus compound containing a phosphinylidyne group and at least one polymerizable mono-olefinically unsaturated compound having an oleophilic hydrocarbon chain of at least 8 carbon atoms. Preferred monomers to be copolymerized with the phosphorus compounds are monoolefinically unsaturated polar-containing compounds having an oleophilic hydrocarbon chain of at least 8 carbon atoms.

A further feature of the present invention is the provision of novel oil-soluble copolymers comprising a dialkenyl substituted phosphorus compound containing a phosphinylidyne group and at least one polymerizable mono-olefinically unsaturated compound having an oleophilic hydrocarbon chain of at least 8 carbon atoms. The term "phosphinylidyne group" is to be construed throughout the present specification as meaning $\equiv P \rightarrow O$ group, (cf. Jour. Chem. Sec., 1952, page 5125).

The dialkenyl substituted phosphorus compounds containing a phosphinylidyne group may be derived from phosphoric acid, phosphonic acid, phosphinic acid or phosphine oxide. Thus a very suitable class of phosphorus compounds is that having the general formula:

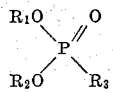

Where $R_1$ and $R_2$ are alkenyl or cycloalkenyl radicals and $R_3$ is a hydrogen atom, or an alkyl, cycloalkyl, aryl, aralkyl or alkaryl radical. $R_1$ and $R_2$ may be $\alpha{:}\beta$ mono-olefinically unsaturated hydrocarbon radicals, e.g. vinyl or $\alpha$- or $\beta$-allyl substituted vinyl radicals, but preferably $R_1$ and $R_2$ are $\beta{:}\gamma$ mono-olefinically unsaturated hydrocarbon radicals of the formula —$CR'_2$—$CR'$=$CR'_2$, where $R'$ is a hydrogen atom or an alkyl group preferably having no more than 6 carbon atoms. $R_1$ and $R_2$ may be the same or different, but are preferably the same, and more preferably they are allyl radicals. Dialkenyl esters of phosphoric acid may be prepared by any method well-known in the art. For example the vinyl type esters may be prepared by dihydrohalogenation of compounds of the formula $(XCH_2CH_2O)_nR_{(3-n)}P \rightarrow O$ where X is halogen, which compound may be themselves prepared by reacting phosphorus chlorides with ethylene oxide.

The allyl type esters can be prepared by reacting the desired phosphorodichloridate with a $\beta{:}\gamma$ mono-olefinically unsaturated alcohol in the presence of an acid-sequestrant, e.g. pyridine. Examples of suitable phosphoric acid esters are diallyl hydrogen phosphate, diallyl methyl phosphate, diallyl phenyl phosphate, diallyl cyclohexyl phosphate, allyl methallyl hydrogen phospate, divinyl hydrogen phosphate, divinyl phenyl phosphate, bis(2-ethylallyl) hydrogen phosphate, dimethallyl benzyl phosphate, dicrotyl hydrogen phosphate, bis(2-pentenyl) hydrogen phosphate and bis (2-hexenyl) isopropyl phosphate.

A further class of phosphorus compounds useful as monomers in the present invention is that having the general formula:

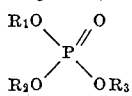

where any two of the groups $R_1$, $R_2$ and $R_3$ are alkenyl or cycloalkenyl groups and the other group is hydrogen, alkyl, cycloalkyl, aryl, alkaryl, or aralkyl. Preferably $R_1$ and $R_2$ are alkenyl or cycloalkenyl radicals. The alkenyl radicals may be $\alpha{:}\beta$ mono-olefinically unsaturated hydrocarbon radicals, e.g. vinyl or $\alpha$ or $\beta$-allyl substituted vinyl radicals, but preferably the alkenyl radicals are $\beta{:}\gamma$ mono-olefinically unsaturated hydrocarbon radicals of the formula —$CR'_2$—$CR'$=$CR'_2$, where $R'$ is a hydrogen atom or an alkyl group preferably having up to six carbon atoms. The alkenyl radicals may be the same or different but are preferably the same, more preferably they are allyl radicals. The above dialkenyl derivatives of phosphonic acid may be prepared by any of the methods well-known in the art. For example if $R_1$ and $R_2$ are alkenyl radicals, the dialkenyl phosphonates may be conveniently prepared by reacting the desired phosphonic dihalide with the desired mono-olefinically unsaturated alcohol in the presence of an acid-sequestrant, e.g. pyridine to product the diester. When $R_2$ and $R_3$ are dialkenyl radicals, the desired compounds may be prepared by an Arbuzov reaction on a dialkyl alkenyl phosphite with an alkenyl halide.

Examples of suitable dialkenyl derivatives of phosphonic acid are diallyl phenylphosphonate, diallyl ethylphosphonate, divinyl ethylphosphonate, the monoallyl ester of allylphosphonic acid, allyl methallyl phenylphosphate, dicrotyl phosphonate, diallyl benzylphosphonate, divinyl phenylphosphonate and di(2-pentenyl) ethylphosphonate.

A further class of dialkenyl phosphorus monomers that may be used in forming the copolymers of the present invention has the general formula:

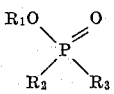

where two of the groups $R_1$, $R_2$ and $R_3$ are alkenyl or cycloalkenyl and the other group is hydrogen, alkyl, cycloalkyl, aryl, aralkyl or alkaryl. Preferably $R_1$ is an alkenyl or cycloalkenyl radical. The alkenyl radicals may be $\alpha{:}\beta$ mono-olefinically unsaturated hydrocarbon radicals, e.g. vinyl or $\alpha$- or $\beta$-alkyl substituted vinyl radicals, but preferably the alkenyl radicals are $\beta{:}\gamma$ mono-olefinically unsaturated hydrocarbon radicals of the formula —$CR'_2$—$CR'$=$CR'_2$, where $R'$ is a hydrogen atom or an alkyl group preferably having up to six carbon atoms. The alkenyl radicals may be the same or different but are preferably the same, more preferably they are allyl radicals. The above dialkenyl derivatives of phosphinic acid may be readily prepared by any of the methods known in the art.

If $R_1$ is alkenyl the $\beta{:}\gamma$ mono-olefinically unsaturated derivative may be prepared by direct esterification of an alkenyl phosphinic acid with the desired $\beta{:}\gamma$ mono-olefinically unsaturated alcohol. Alternatively if $R_1$ is alkenyl and both alkenyl radicals in the product are to be the same, a convenient method of preparation is to react a phosphonous dichloride with the desired $\beta{:}\gamma$ mono-olefinically unsaturated alcohol to form the diester of a phosphinous acid which partially undergoes an Arbuzov re-arrangement to form the ester of the corresponding phosphinic acid which may be separated from the reaction mixture by distillation.

If $R_2$ and $R_3$ are both alkenyl radicals, the desired product may be obtained by reacting a phosphorodihalidate of the formula $ROP(O)X_2$ with an alkenyl Grignard reagent, e.g. $R'M_gBr$ ($R'$ is alkenyl) to form $$ROP(O)R'_2$$

Examples of dialkenyl derivatives of phosphinic acid are the allyl ester of phenyl-prop-2-enyl-phosphinic acid, the allyl ester of prop-2-enyl phosphinic acid, the vinyl ester of vinylphenylphosphinic acid, diallyl phosphinic acid, allylmethallylphosphinic acid, ethyl diallylphosphinate, phenyl divinylphosphinate and methyl allylmethallylphosphinate.

A still further class of dialkenyl phosphorus compounds useful in the present invention is that having the general formula:

where $R_1$ and $R_2$ are alkenyl or cycloalkenyl radicals and $R_3$ is a hydrogen atom or an alkyl, cycloalkyl, aryl, aralkyl, or alkaryl radical. $R_1$ and $R_2$ may be $\alpha{:}\beta$ mono-olefinically unsaturated hydrocarbon radicals, e.g. vinyl or $\alpha$- or $\beta$-alkyl substituted vinyl radicals, but preferably $R_1$ and $R_2$ are $\beta{:}\gamma$ mono-olefinically unsaturated hydrocarbon radicals of the formula $-CR'_2-CR'=CR'_2$, where $R'$ is a hydrogen atom or an alkyl group preferably having up to six carbon atoms. $R_1$ and $R_2$ may be the same or different, but preferably they are the same and more preferably they are allyl groups. Such phosphine oxides may readily be prepared by the reaction between a dihalophosphine and the desired alkenyl Grignard reagent followed by air oxidation. Exemplary of suitable phosphine oxides are diallyl phenyl phosphine oxide, divinyl phenyl phosphine oxide, diallyl ethyl phosphine oxide, diallyl benzyl phosphine oxide, allyl methallyl phenyl phosphine oxide, dimethallyl phenyl phosphine oxide and dimethallyl isopropyl phosphine oxide.

Mixtures of two or more of the foregoing monomers can be used if desired.

Typical of the other polymerizable mono-olefinically unsaturated compounds having an oleophilic hydrocarbon chain of at least 8 carbon atoms with which the foregoing phosphorus compounds may be copolymerized are acrylic acid and $\alpha$-substituted acrylic acids and their derivatives, such as their esters, nitriles and amides. Examples of such compounds are $C_{8-18}$ alkyl substituted ethacrylic acid, $\alpha$-dicresyl acrylic acid, the alkyl esters thereof, e.g. octyl, nonyl, lauryl, cetyl, oleyl, stearyl and dimethylcyclohexyl esters, $\alpha$-ethylhexyl-acrylamide, laurylacrylamide, $\alpha$-octaacrylonitrile, 2-butyl 2 hexenenitrile, 2-propyl 2-octenenitrile, 2-chloroethyl 2-hexenenitrile, 2-ethyl 3-chloro 2-hexenenitrile, 2-isopropyl 3-bromo 2-cotenenitrile, and $\alpha$-octyl $\beta$-cyclohexylacrylonitrile.

Other compounds which may be used to form the copolymers used in the present invention are vinyl esters of organic acid such as vinyl laurate, vinyl stearate, vinyl ethers such as vinyl octyl ether, vinyl lauryl ether, vinyl dicresyl ether, vinyl ketones such as octyl vinyl ketone, lauryl vinyl ketone, and stearyl vinyl ketone, vinyl aryl compounds such as ortho-octyl styrene, para-lauryl styrene, para-stearyl styrene, $\alpha$-octyl styrene and other alkyl derivatives of styrene in which a $C_{8-18}$ alkyl group or groups may be substituted in the ring or in the side chain or both. Allylesters, ethers and ketones corresponding to the vinyl compounds listed above may also be used. $\alpha,\beta$-unsaturated polycarboxylic acids and their derivatives such as maleic, fumaric, citraconic, itaconic, crotonic, aconitic and tricarballylic acids and their mono-polyesters with aliphatic and aromatic alcohols, and their amides and nitriles, may also be used.

Other compounds which may be used to form the phosphorus containing copolymers used in the present invention are the $\alpha$-olefins particularly those having more than 8 and preferably 12–20 carbon atoms, amino-substituted olefins, e.g. p-($\beta$-dioctylaminoethyl)styrene and nitrogen-containing heterocyclic compounds having a mono-olefinically unsaturated substituent, e.g. the vinyl pyridines (whether 2-, 3- or 4-substituted) and the vinyl alkyl pyridine, 3-lauryl-5-vinyl pyridine, 4-lauryl-2-vinyl pyridine, 4-stearyl-2-vinyl pyridine and 2-stearyl-5-vinyl pyridine. Vinyl lactams are also suitable monomers, particularly the N-vinyl pyrrolidones or N-vinyl piperidones. These vinyl compounds should have at least one $C_{8-15}$ alkyl radical in the molecule.

Of the above listed monomers copolymerizable with the phosphorus containing monomers according to the present invention, it is preferred that they contain at least one oleophilic hydrocarbon chain of at least eight carbon atoms which is preferably an alkyl radical of 12 to 20 carbon atoms, and such copolymers per se are a feature of the present invention. Mixtures of the above monomers may be used in forming the copolymers used in lubricating oil additives according to the present invention. Particularly preferred copolymers are those formed from dialkenylsubstituted phosphorus compounds with a higher alkyl ester of an acrylic or methacrylic acid, i.e. where the ester group containing 8 or more carbon atoms, e.g. lauryl methacrylate. Minor proportions of lower alkyl esters of acrylic or methacrylic acids, e.g. methyl methacrylate, may advantageously be present in such copolymers.

The molar ratio of phosphorus containing monomer to the polymerizable comonomer may vary within wide limits and generally lies between 20:1 and 1:20. Preferably the ratio lies between 1:1 and 1:20, with ratios between 1:3 and 1:10 being especially suitable.

The copolymers of this invention can be prepared by any suitable means. Normally the reactants are copolymerized in the presence of a catalyst. Oxygen-yielding catalyst, such as organic peroxides may be used. These may be aliphatic, aromatic, heterocyclic, or alicyclic peroxides, such as diethyl peroxide, tertiary butyl hydroperoxide, di-(tertiary butyl) peroxide, benzoyl peroxide, dimethyl thienyl peroxide, dilauroyl peroxide and urea peroxide. Other catalysts include sodium bisulphite, diethyl sulfoxide, ammonium persulfate, alkali metal perborates and azo compounds, e.g. azo-(bis-isobutyro) nitrile. The catalysts are generally used in an amount of 0.1 to 5% by weight of the reactants.

The copolymerization reaction may be carried out under a variety of conditions. For example, the reaction can be carried out in the presence or absence of an inert solvent, such as a hydrocarbon, under a blanket of nitrogen or carbon dioxide and at a temperature varying from room temperature or lower to about 180° C. or higher for a period of from about 2 to 48 hours.

It is preferred that the reaction be carried out in such a way that the resulting copolymer has a molecular weight above 50,000 and preferably between 75,000 and 1,000,000.

The following examples illustrate methods of producing copolymers of the present invention.

EXAMPLE 1

A solution of 277 g. of allyl alcohol and 326 g. pyridine in 280 ml. of ether was cooled to approximately −30° C. by means of a bath of IPA/CO₂ and was then added to a solution of 255 g. phosphorus oxychloride in 132 ml. ether over a period of two hours. After the first hour a further 100 ml. of ether was added to facilitate stirring. The reaction mixture was stirred for a further three hours after which time the pyridinium chloride formed was filtered off. The filtrate was evaporated leaving triallylphosphate as a clear yellow oil.

51 grams of the triallylphosphate was dissolved in 100 ml. of I.M.S. and refluxed with 100 ml. of 5 N aqueous solution hydroxide for two hours. The solvents were then removed under reduced pressure (100° C./15 mm.) and the residual oil was extracted with ether in order to remove unhydrolyzed phosphate. The oil was then treated with dilute hydrochloric acid until acid and the oil thus separated was extracted with ether to produce diallyl hydrogen phosphate.

A mixture of 3.4 g. of the diallyl hydrogen phosphate and 25 g. of lauryl methacrylate in 15.5 g. of technical white oil and 20 ml. of benzene was treated with 0.5 g. benzoyl peroxide and treated at 70° C. for 18 hours with stirring. The benzene was then evaporated to leave the copolymer as a viscous, oil-soluble product. The molar ratio of the diallyl hydrogen phosphate to lauryl methacrylate in the copolymer was 1:6.

EXAMPLE 2

Phenylphosphonous dichloride was prepared by refluxing together 525 ml. phosphorous trichloride, 468 ml. benzene and 300 g. of aluminum chloride for four hours. Phosphorus oxychloride (223 ml.) was then added and the mixture briefly refluxed. Excess benzene and phosphorus trichloride was evaporated under vacuum and the residue cooled to about 40° C. and extracted with ligroin. From the extract, crude phenylphosphonous dichloride was recovered and purified by redistillation under reduced pressure.

A solution of 60.5 g. of allyl bromide in 285 ml. ether was added dropwise to 12 g. magnesium in 100 ml. ether. After stirring for 1 hour, 23 g. of phenylphosphonous dichloride in 100 ml. of ether was added and the mixture stirred overnight. A solution of 50 g. of aluminum chloride in 250 ml. water was added and the etheral layer was separated, dried over sodium sulfate and evaporated.

The resultant crude diallylphenylphosphine was purified by redistillation. All these operations were conducted in a nitrogen atmosphere.

5.5 grams of the diallylphenyl phosphine was dissolved in 12 ml. of benzene and air passed through the solution for thirty minutes to produce diallylphenyl phosphine oxide. To this solution was added 23 ml. benzene, 15 g. of technical white oil, 7 g. of lauryl methacrylate and 0.5 g. of benzoylperoxide. The mixture was heated to 75° C. and stirred for 24 hours. At the end of each of the first three hours, a further amount of 7 g. lauryl methacrylate was added and with the third addition, a further 0.5 g. of benzoyl peroxide was added. The benzene was evaporated at reduced pressure and the residue heated at 100° C./1 mm. Hg for 30 minutes. The resulting copolymer solution of diallyl phenyl phosphine oxide and lauryl methacrylate in technical white oil was soluble in mineral oil. The molar ratio of diallyl phenyl phosphine oxide to lauryl methacrylate was 1:4.

EXAMPLE 3

Phenyl phosphonous dichloride (prepared as in Example 2, 90 g.) was dissolved in carbon tetrachloride (500 ml.) and the whole cooled to −50° C. by a cardice/IPA coolant. Dry chlorine gas was not bubbled into the solution until the exothermic reaction was complete. The product was filtered while cool to give a residue of phenyl phosphonic tetrachloride. Further quantities of this material was obtained by evaporation of the mother liquors. The product was purified by recrystallization from carbon tetrachloride, followed by drying in a vacuum desiccator.

Phenyl phosphoinc tetrachloride (63 g.) was dissolved in benzene (250 ml.) and the stirred mixture treated with sulfur dioxide until reaction was complete. The reaction is rapid and the phenyl phosphonic dichloride Ph.POCl$_2$ produced was recovered by distillation B.P. 87° C./1 mm. Hg. Phenyl phosphonic dichloride (49 g.) was added slowly with stirring to a solution of allylalcohol (29 g.) and pyridine (40 g.) in ether (250 ml.) cooled to 0° C. The rate of addition was such that the temperature of the mixture remained at 0° C. Stirring was continued for 2 hours after complete addition. The reaction product was filtered to remove pyridine hydrochloride and the residue washed with 200 ml. ether. The ether was evaporated from the filtrate and the residue distilled to give diallyl phenyl phosphonate B.P. 112° C./0.3 mm. Hg.

To a solution of diallyl phenyl phosphonate (5.9 g.) and lauryl methacrylate (25.4 g.), ditert-butyl peroxide (0.4 ml.) was added and the whole stirred vigorously. The solution was maintained under these conditions for 5 hours. The product had a molar ratio of 1:4 diallyl phenyl phosphonate to lauryl methacrylate and was a 66.7% concentration in mineral oil. This concentrate was readily soluble in further samples of mineral oil.

EXAMPLE 4

To a solution of allyl alcohol (135 g.) and pyridine (168 g.) in diethyl ether (2000 ml.), phenyl phosphonour dichloride was added slowly with stirring. The rate of addition was adjusted to maintain a gentle reflux. Stirring and refluxing were continued for a further two hours after complete addition. Pyridine hydrochloride was filtered off and the residue washed with more ether (500 ml.). The ether was evaporated from the filtrate and the product distilled, the bulk of the material (allkyl phenyl-prop-2-enyl-phosphinate) boiling at 102°/0.4 mm. Hg. Small amounts of diallyl phenylphosphonite are separated during the distillation B.P. 79° C./0.4 mm. Hg.

To a solution of allyl phenylprop-2-enyl phosphinate (6 g.) and lauryl methacrylate (28 g.) in mineral oil (68 g.) at 140–5° C. di-tert-butyl peroxide (0.4 ml.) was added and the whole stirred vigorously for 24 hours. The product was heated at 100° C./0.5 mm. Hg for 30 minutes but no distillate was obtained. This product had a 1:4 molar ratio of allyl phenylprop-2-enyl-phosphinate to lauryl methacrylate and was a 33.3% concentrate in mineral oil.

Other copolymers useful in lubricating compositions of this invention include those listed below.

Diallyl phenyl phosphate/α-octyl acrylamide, diallyl cyclohexylphosphate/vinyl laurate, dimethallyl hydrogen phosphate/lauryl methacrylate, diallyl phenyl phosphate/vinyl laurate, divinyl ethylphosphonate/α-octyl acrylonitrile, dimethyallyl ethylphosphonate/oleyl maleate, allyl prop-2-enyl-phosphinate/lauryl methacrylate, diallyl phosphinic acid/stearyl methacrylate, divinyl phenyl phosphine oxide/stearyl methacrylate, dimethallyl phenyl phosphine oxide/2-octyl-5-vinyl pyridine and diallyl ethylphosphine oxide/lauryl methacrylate.

The lunbricating oil in the lubricating compositions of the invention can be any natural or synthetic oil having lubricating properties. Thus, the oil can be a hydrocarbon lubricating oil obtained from paraffinic or naphthenic crude or mixtures thereof. The viscosity of these oils may vary over a wide range, such as from 100 SUS at 100° F. to 100 SUS at 210° F. The hydrocarbon lubricating oil may be blended with fatty oils such as castor oil or lard oil, and/or with synthetic lubricating oils such as polymerized olefins, copolymers of alkylene glycols and alkylene oxides, organic esters, e.g. di(2-ethylhexyl)sebacate, dioctyl phthalate and trioctyl phosphate and polyalkyl silicone polymers such as dimethyl silicone polymers. If desired, the synthetic lubricating oils may be used as the sole base lubricating oil or admixed with fatty oils or derivatives thereof.

In the lubricating compositions of the present invention the polymeric additive is present in a minor proportion by weight based on the total composition, generally from 0.01% to 20% and preferably from 0.1% to 8% by weight.

It will be understood that the lubricating compositions of the invention may be modified by the addition thereto of minor proportions of other additives such as metal dithiophosphates, e.g. zinc di-2-ethylhexyl dithiophosphate, metal organic sulfonates, e.g. neutral or basic calcium, barium or zinc petroleum sulfonate; metal thiocarbonates, e.g. zinc, chromium or calcium dibutyl or diamyl dithiocarbamate; amines, e.g. phenyl-alpha-naphthylamine or octadecylamine; alkylated phenols and alkylated bisphenols, e.g. 2,6-ditertiarybutyl-4-methylphenol, 2,6-ditertiarybutyl - 4 - hydroxybenzylalcohol and 4,4' - methylene bis(2,6-ditertiarybutyl phenol); organic sulfides, e.g. dibenzyldisulfide.

Lubricating compositions of the present invention are useful as engine oil, gear oils, turbine oils and various other fields of lubrication where detergency, viscosity index and load carrying properties are essential.

Compositions of this invention are illustrated by the following formulations; the ratios in brackets being the mole ratios of the monomers used for preparing the copolymers. The mineral lubricating oil used is an oil having a viscosity of 10 cs. at 210° F.

*Composition A:*
Copolymer of diallyl hydrogen phosphate/
lauryl methacrylate (1:6) _____ 4% wt.
Mineral oil _____ Balance.

*Composition B:*
Copolymer of diallyl hydrogen phosphate/
lauryl methacrylate (1:8) _____ 4% wt.
Mineral oil _____ Balance.

*Composition C:*
Copolymer of diallyl phenyl phosphine
oxide/lauryl methacrylate (1:4) _____ 3.5% wt.
Mineral oil _____ Balance.

*Composition D:*
Copolymer of allyl ester of phenyl-prop-2-
enyl phosphinic acid/lauryl methacrylate (1:4) _____ 2.7% wt.
Mineral oil _____ Balance.

*Composition E:*
Copolymer diallyl phenyl phosphonate/
lauryl methacrylate (1:4) _____ 6.8% wt.
Mineral oil _____ Balance.

*Composition F:*
Copolymer of diallyl phenyl phosphine
oxide/lauryl methacrylate (1:4) _____ 3.9% wt.
4,4' - methylene - bis(2,6 - ditertiarybutyl phenol) _____ 0.75% wt.
Mineral oil _____ Balance.

In order to illustrate the properties of lubricating compositions according to the present invention, certain compositions were subjected to tests in the following manner.

The thickening ability of the copolymers used as additives in the present invention was assessed in terms of the VT coefficient, calculated from the formula:

$$VT = \frac{\frac{\eta_{blend}^{210°F.} - \eta_{base\ oil}^{210°F.}}{\eta_{base\ oil}^{210°F.}}}{\frac{\eta_{blend}^{100°F.} - \eta_{base\ oil}^{100°F.}}{\eta_{base\ oil}^{100°F.}}} \times 100$$

where $\eta$ is the viscosity.

Various copolymers were added to a base mineral lubricating oil having a viscosity of 10 cs. at 210° F. and the VT values determined from the above equation. The results are contained in Table I.

*Table I*

| Copolymer | Concentration, percent wt. | VT |
|---|---|---|
| Diallyl hydrogen phosphate/lauryl methacrylate (1:6) | 4 | 109 |
| Allyl ester of phenyl-prop-2-enylphosphinic acid/lauryl methacrylate (1:4) | 4.1 | 117 |
| Diallyl phenyl phosphine oxide/lauryl methacrylate (1:4) | 2 | 109 |

These figures represent good thickening properties. The dispersant properties of various compositions were illustrated in the following manner.

1 part by weight of used straight mineral oil containing about 2% w. of oil-insolubles, from a diesel engine was mixed with 5 parts of the unused mineral oil of Compositions A–F. In this blend the insoluble particles are clustered. Other blends are made containing as before, ⅙ of used oil, and the remaining ⅚ a series of increasing concentrations of one of the additives in the unused mineral oil. At a particular concentration the insoluble particles became dispersed, and this concentration is taken as a measure of the dispersancy of the additive. Some results are given in Table II.

*Table II*

Concn. of copolymer required to disperse clusters in mg. per g. blend

Copolymer:
Diallylphosphate/lauryl methacrylate (1:6) ___ 0.4
Diallylphenylphosphine oxide/lauryl methacrylate (1:4) _____ 0.3

Composition F exhibited good low temperature performance properties when used in an automotive engine as is evidenced by absence of sludge deposition in the sump. Further, Composition F was submitted to an antiscuffing test in an automotive engine in which the cam wear and degree of tappet scuffing is indicative of the load carrying capacity of the oil. Compared with a similar formulation, but in which the 3.9% of the copolymer according to the invention is replaced by 4% wt. of a copolymer of lauryl methacrylate and vinyl pyrrolidone, Composition F exhibits a 60% reduction in the amount of tappet scuffing and a 90% reduction in cam wear. Also, Compositions A and D, when subjected to a test for extreme pressure properties on the 4-ball machine, exhibited 2½ second seizure delay loads of 137 kg. and 92 kg. respectively compared with 65 kg. for the base oil.

I claim as my invention:

1. A mineral lubricating oil composition comprising a major proportion of a mineral lubricating oil and from about 0.01% to about 20% by weight of a copolymer of a dialkenyl substituted phosphorus compound selected from the group consisting of dialkenyl phosphate, dialkenyl phosphonate and dialkenyl phosphine oxide and a $C_{8-20}$ alkyl acrylate, in the mol ratio of 1:20 to 20:1, respectively and having a molecular weight of from about 20,000 to about 1,000,000.

2. A mineral lubricating oil composition as claimed in claim 1, wherein the phosphorus compound is a dialkenyl phosphate and the mol ratio of the reactants being from 1:1 to 1:20, respectively.

3. A mineral lubricating oil composition as claimed in claim 1, wherein the phosphorus compound is a dialkenylphosphonic acid and the mol ratio of the reactants being from 1:1 to 1:20, respectively.

4. A mineral lubricating oil composition as claimed in claim 1, wherein the dialkenyl substituted phosphorus compound is a dialkenyl phosphine oxide and the mol ratio of the reactants being from 1:1 to 1:20, respectively.

5. A mineral lubricating oil composition comprising a major amount of a mineral lubricating oil and from about 0.1% to about 8% by weight of an oil-soluble copolymer of diallyl hydrogen phosphate and lauryl methacrylate in the mol ratio of 1:3 to 1:10, respectively, said copolymer having a molecular weight of from about 50,000 to 1,000,000.

6. A mineral lubricating oil composition comprising a major amount of a mineral lubricating oil and from about 0.1% to about 8% by weight of an oil-soluble copolymer of diallyl phenyl phosphine oxide and lauryl methacrylate with mol ratio of 1:3 to 1:10, respectively, said copolymer having a molecular weight of from about 50,000 to 1,000,000.

References Cited by the Examiner
UNITED STATES PATENTS

| | | | |
|---|---|---|---|
| 2,659,714 | 11/53 | Harman et al. | 252—49.8 X |
| 2,694,684 | 11/54 | Rogers et al. | 252—49.8 |
| 2,711,403 | 6/55 | Stiles et al. | 252—49.8 X |
| 2,779,739 | 1/57 | Spivack | 252—49.8 |
| 2,867,610 | 1/59 | Toy et al. | 260—86.1 X |
| 2,909,559 | 10/59 | Lanham | 260—461 |
| 2,963,437 | 12/60 | Ries | 252—49.8 |
| 2,971,019 | 2/61 | Ladd et al. | 260—461 |

DANIEL E. WYMAN, *Primary Examiner.*

JULIUS GREENWALD, *Examiner.*